3,320,327
BICYCLIZATION
Paul R. Stapp, Bartlesville, Okla., assignor to Phillips Petroleum Company, a corporation of Delaware
No Drawing. Filed Feb. 7, 1966, Ser. No. 525,331
6 Claims. (Cl. 260—666)

This invention relates to a method for forming bicyclic olefins, particularly bicyclo[3.2.1]oct-2-enes.

Heretofore bicyclo[3.2.1]oct-2-enes have been formed by various procedures some of which employed catalysts containing compounds of metals such as the rare earth metals, e.g. lanthanum, cerium, and the like.

Quite surprisingly, it has now been found that bicyclic olefins can be readily formed using catalysts containing metals of Group II. Accordingly, by this invention bicyclic olefins are formed from 4-vinylcyclohexene and alkyl substituted derivatives thereof using a catalyst formed on mixing at least one halide of beryllium, magnesium, calcium, strontium, barium, zinc, cadmium, and mercury with at least one alkali metal aluminum hydride.

It is an object of this invention to provide a new and improved method for making bicyclic olefins. Another object is to provide a process for the production of bicyclo[3.2.1]oct-2-enes.

Other, aspects, objects, and the several advantages of this invention will be apparent to those skilled in the art from the description and the appended claims.

According to this invention, the catalyst utilized is that obtained by mixing at least one chloride, bromide, or iodide, preferably chloride, of the above-mentioned Group II metals, preferably magnesium, calcium, and barium, with at least one alkali metal aluminum hydride wherein the alkali metal is selected from the group consisting of lithium, sodium, potassium, rubidium, and cesium, preferably lithium.

The mixing of the halide component and the alkali metal aluminum hydride component can be carried out in any conventional manner such as by simple dry or liquid blending, stirring, ball milling, and the like, preferably in the presence of a medium substantially inert to the reactants' bicyclization products. Suitable mediums include paraffinic, cycloparaffinic, and aromatic hydrocarbons which have from 1 to 12 carbon atoms per molecule, inclusive, and mixtures thereof. The catalytic mixture is preferably pre-formed and then introduced into the reaction zone but can be prepared in situ in the reaction zone, if desired, by separately adding the halide and hydride components thereto. The mixing time and temperature for the preparation of the pre-formed catalytic mixture can vary widely but will generally be from about 1 minute to about 5 days and from about 20° C. or lower to about 300° C., preferably from about 20 to about 100° C. The mole ratio of the halide component to the hydride component can vary widely but will generally be from about 0.1/1 to about 10/1, preferably from about 0.25/1 to about 1/1.

The vinylcyclohexenes which are suitable for conversion to bicyclo[3.2.1]oct-2-enes according to this invention are represented by the formula:

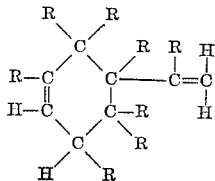

wherein R is selected from the group consisting of hydrogen, and alkyl radicals containing from 1 to 8 carbon atoms, preferably 1 to 2 carbon atoms, and wherein the total number of carbon atoms in the molecule does not exceed 20.

Some examples of these vinylcyclohexenes are 4-vinylcyclohexene, 4-methyl-4-vinylcyclohexene, 5-methyl - 4- isopropenylcyclohexene, 2-methyl-4 - isopropenylcyclohexene, 3,4-dimethyl-4-vinylcyclohexene, 3,5-dimethyl-4-vinylcyclohexene, 5-n-octyl-4-vinylcyclohexene, 2,5,6-triisobutyl-4-vinylcyclohexene, 5,5-dimethyl-4 - vinylcyclohexene, 2,3,3,4,5,6-heptamethyl-4 - vinylcyclohexene, 4-(1-n-amylvinyl)cyclohexene, and the like.

The bicyclo[3.2.1]oct-2-ene products which are obtained by this invention will correspond to the vinylcyclohexene utilized and are represented by the formula:

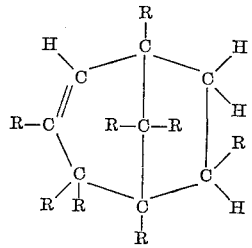

wherein R is as defined previously.

Some examples of these products are bicyclo[3.2.1]oct-2-ene, 5-methylbicyclo[3.2.1]oct-2-ene, 4,6 - dimethylbicyclo[3.2.1]oct-2-ene, 1,6-dimethylbicyclo[3.2.1]oct - 2-ene, 5,8-dimethylbicyclo[3.2.1]oct-2-ene, 4,8-dimethylbicyclo[3.2.1]oct-2-ene, 4-n-octylbicyclo[3.2.1]oct-2 - ene, 1,3,4-triisobutylbicyclo[3.2.1]oct-2-ene, 4,4 - dimethylbicyclo[3.2.1]oct-2-ene, 1,3,4,4,5,8,8 - heptamethylbicyclo [3.2.1]oct-2-ene, 6-n-amylbicyclo[3.2.1]oct-2 - ene, and the like.

The catalyst of this invention and at least one of the vinylcyclohexene disclosed above are contacted in any conventional contacting apparatus, either in the presence or absence of a diluent, to produce the desired bicyclic olefin. A diluent is generally preferred and any medium which is substantially inert to the catalyst, vinylcyclohexene, and the bicyclic olefin produced can be employed, preferred diluents being those used as the inert medium in the catalyst preparation steps discussed above. Additional diluents which can be employed are ethers having from 2 to 8 carbon atoms per molecule, inclusive, and trialkylamines having from 3 to 12 carbon atoms per molecule, inclusive. Examples of suitable hydrocarbons that can be employed include cyclohexane, benzene, dodecane, and the like and mixtures thereof.

The time of contacting the catalyst and vinylcyclohexene can vary widely but will generally be in the range of from about 15 minutes to about 24 hours, preferably from about 2 to about 8 hours. The reaction pressure can vary widely but will generally be that which is sufficient to maintain the reactants substantially in a liquid phase and can vary widely from about 100 to about 5000 p.s.i.g. or higher. The reaction temperature can also vary widely but will generally be that sufficient to effect bicyclization and is preferably in the range of from about 100 to about 300, preferably from about 200 to about 250° C. The amount of catalyst employed will generally be from about 0.01 to about 10 weight percent based on the vinylcyclohexene present.

After completion of the reaction the bicyclic olefins can be isolated from the reaction mixture by conventional methods such as solvent extraction, distillation, adsorption, crystallization, and the like. It is sometimes convenient to remove the catalyst from a reaction mixture by hydrolysis and extraction such as by contact of the reaction mixture with dilute aqueous inorganic acid followed by separation and removal of the aqueous phase.

Example I

A catalyst was prepared by stirring 1.52 grams (40 millimoles) of lithium aluminum hydride and 1.91 grams (20 millimoles) of anhydrous magnesium chloride in 100 milliliters of benzene at room temperature for about 16 hours. The catalyst was then transferred to a 1-liter autoclave together with 400 milliliters of benzene and 249 grams of 4-vinylcyclohexene. The autoclave was then heated to and maintained at 240° C. for 6 hours under autogenous pressure and with stirring. The autoclave was allowed to cool to room temperature, was opened, and the reaction mixture was removed. The reaction mixture was washed with a 10 percent hydrochloric acid solution, filtered, washed with water, and subjected to fractionation to remove the diluent. A 212 gram quantity of 8 carbon atom containing material was recovered from the reaction mixture. This 212 gram quantity was analyzed by vapor phase chromatography and showed the presence of bicyclo[3.2.1]oct-2-ene and also a 4-vinylcyclohexene conversion of 34.7 percent with a 31.1 percent ultimate yield of bicyclo[3.2.1]oct-2-ene.

Example II

A catalyst was prepared by mixing 4.16 grams (20 millimoles) of anhydrous barium chloride and 1.52 grams (40 millimoles) of lithium aluminum hydride in 100 milliliters of benzene at room temperature for about 16 hours.

The catalyst was then transferred to a 1-liter autoclave with 300 milliliters of benzene and 249 grams of 4-vinylcyclohexene. The autoclave was then heated to and maintained at 240° C. under autogenous pressure for 6 hours.

The autoclave was cooled to room temperature, was opened, and the reaction mixture analyzed by vapor phase chromatography. The results of the analysis showed bicyclo[3.2.1]oct-2-ene present and a 4-vinylcyclohexene conversion of 33.2 percent with a 32.8 percent ultimate yield of bicyclo[3.2.1]oct-2-ene.

Reasonable variations and modifications are possible within the scope of this disclosure without departing from the spirit and scope thereof.

I claim:
1. A method for forming bicyclic olefins comprising contacting under bicyclization conditions at least one of 4-vinylcyclohexene and alkyl substituted derivatives thereof with a catalyst formed on admixing at least one halide of at least one metal selected from the group consisting of beryllium, magnesium, calcium, strontium, barium, zinc, cadmium, and mercury with at least one alkali metal aluminum hydride.

2. The method according to claim 1 wherein said vinylcyclohexenes are represented by the formula

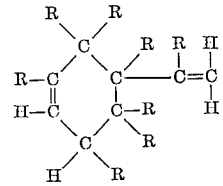

wherein R is selected from the group consisting of hydrogen, and alkyl radicals, and wherein the total number of carbon atoms in the molecule does not exceed 20.

3. The method according to claim 1 wherein the metal halide is at least one of chlorides, bromides, and iodides, of at least one of magnesium, calcium, and barium.

4. The method according to claim 1 wherein the reaction is carried out in the presence of a substantially inert diluent, the reaction temperature is in the range of from about 100 to about 300° C., and the catalyst is in the range of from about 0.1 to about 10 weight percent based on the amount of vinylcyclohexene to be reacted.

5. The method according to claim 1 wherein 4-vinylcyclohexene is contacted with a catalyst formed on mixing magnesium chloride and lithium aluminum hydride.

6. The method according to claim 1 wherein 4-vinylcyclohexene is contacted with a catalyst formed on mixing barium chloride and lithium aluminum hydride.

No references cited.

DELBERT E. GANTZ, *Primary Examiner.*

V. O'KEEFE, *Assistant Examiner.*